Figure 1:
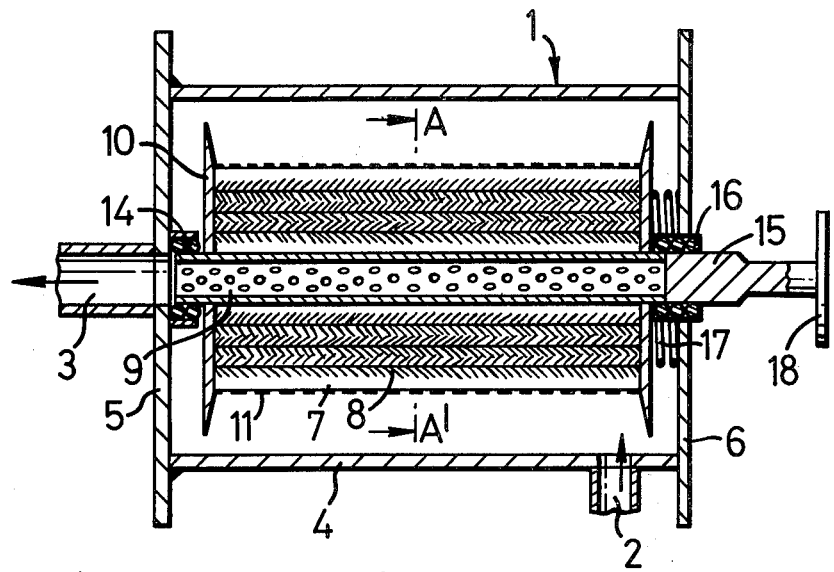

United States Patent [19]

Ward

[11] 4,411,791
[45] Oct. 25, 1983

[54] SEPARATION EQUIPMENT

[75] Inventor: Denis S. Ward, Walton-on-Thames, England

[73] Assignee: The British Petroleum Company, p.l.c., London, England

[21] Appl. No.: 341,136

[22] Filed: Jan. 20, 1982

[30] Foreign Application Priority Data

Jan. 21, 1981 [GB] United Kingdom ................. 8101786

[51] Int. Cl.³ ...................... B01D 17/02; B01D 27/12
[52] U.S. Cl. .................................. 210/649; 210/799;
210/351; 210/437; 210/DIG. 5
[58] Field of Search ............... 210/693, 791, 799, 317,
210/338, 350, 387, 437, 445, 450, 453, 497.1,
498, DIG. 5, 649, 797, 351, 398

[56] References Cited

U.S. PATENT DOCUMENTS

| | | | |
|---|---|---|---|
| 1,821,082 | 9/1931 | Tyler | 210/387 |
| 2,250,672 | 7/1941 | Keefer | 210/387 |
| 2,375,765 | 5/1945 | Briggs | 210/439 |
| 2,394,895 | 2/1946 | Burhans | 210/350 |
| 3,063,888 | 11/1962 | Howard et al. | 210/487 |
| 3,527,351 | 9/1970 | Wade | 210/440 |
| 3,931,019 | 1/1976 | Fowler | 210/485 |
| 3,936,019 | 2/1976 | Craigle | 244/137 R |
| 4,048,074 | 9/1977 | Bruenemann et al. | 210/387 |
| 4,092,246 | 5/1978 | Kummer | 210/494.1 |
| 4,240,908 | 12/1980 | Swain et al. | 210/799 |
| 4,299,699 | 10/1980 | Boogay | 210/317 |

FOREIGN PATENT DOCUMENTS

| | | |
|---|---|---|
| 4724 | 10/1979 | European Pat. Off. . |
| 693489 | 7/1953 | United Kingdom . |
| 1199005 | 7/1970 | United Kingdom . |

*Primary Examiner*—Peter A. Hruskoci
*Attorney, Agent, or Firm*—Morgan, Finnegan, Pine, Foley & Lee

[57] ABSTRACT

A cartridge (7) for removing contaminants from a liquid comprises (a) a central inlet or outlet, (b) a circumferential outlet or inlet for radial flow through the cartridge and (c) a resilient, helically coiled plate (8) permeable to liquid. One edge of the plate is secured at or near the central inlet or outlet, the other edge is secured at or near the circumferential outlet or inlet and means is provided for tensioning the plate.

The cartridge may be used in a filter.

It may be modified by adding a fibrous layer to the coiled plate. This renders it suitable for use as a coalescer.

4 Claims, 2 Drawing Figures

U.S. Patent  Oct. 25, 1983  4,411,791

SEPARATION EQUIPMENT

This invention relates to apparatus and a method for removing contaminants from a liquid. The contaminants may be solid particles, including scale and wax, and/or a second liquid immiscible with but finely dispersed in the first liquid.

In operations in which large quantities of oil contaminated water are produced as effluent, e.g. oil refining and washing ships' tanks, the feed water is frequently taken from nearby sources, e.g. the sea or a river. After use of the water, the effluent is returned ultimately to a natural source; before returning effluent directly to a source or indirectly through a sewage system contaminating oil must be removed.

The converse problem also exists, i.e., the removal of contaminating water from oil. In the production of crude oil from an oilfield it is usual for the oil initially produced to be substantially free from water. However, during the life of the oilfield the proportion of water produced with the crude oil usually increases and a point is reached when it may be desirable to separate the oil from the produced water before transporting the oil from the well head either by pipeline or tanker. In this case also, the separated water may require purification.

Several devices for dealing with these problems are known and coalescing cartridges having rigid elements have, in general, proved to be the most popular. These however, suffer from certain disadvantages. The element, frequently a glass fibre element, acts both as a coalescing medium and as a filter. The filtration effect means that the cartridge eventually becomes blocked by the suspended solids removed from the stream under treatment. When this happens, the cartridge must be replaced. This is undesirable. Cartridge replacement requires shutdown, venting and purging of the coalescer vessel in question and the cost, transport, storage and disposal of cartridges have to be considered.

We have now devised apparatus suitable for filtering solids from liquids which is compact and easy to regenerate. The apparatus may be modified to improve the quality of either water contaminated with oil or oil contaminated with water by causing the dispersed phase to coalesce and separate.

Thus according to the present invention there is provided a cartridge for removing contaminants from a liquid, which cartridge comprises (a) a central inlet or outlet, (b) a circumferential outlet or inlet for radial flow through the cartridge, (c) a resilient, helically coiled plate permeable to liquid, one edge of the plate being secured at or near the central inlet or outlet and the other edge being secured at or near the circumferential outlet or inlet, and (d) means for tensioning the plate.

By radial flow is meant flow from the circumference to the center or vice versa.

The plate is preferably a sheet of perforated metal or metal gauze.

In use, the helically coiled plate is tensioned to close the helix to form a network of fine channels.

The coil may be tensioned by winding up the helix by known means, such as levers, handles or gears, and is preferably lockable in any desired position.

The cartridge is conveniently utilised in equipment comprising a container having an inlet and an outlet, the cartridge being interposed between them.

The cartridge may be modified to act as a coalescer by securing a layer of fibres to the helically coiled plate. The fibres are selected according to the duty, to be hydrophobic or hydrophilic. Consideration of the affinity of the selected fibre for the types of solid present (if any) is also necessary.

In general, fibre diameters should be in the range 1 to 1000 micron.

Preferably the layer of fibres does not extend to the edges of the plate, to facilitate securing of the latter.

Suitable fibre materials include natural and synthetic products such as wool, cotton, rayon, nylon, polyacrylonitrile, polyester and mineral wool. Metal fibres may also be used. Combinations of fibre types are sometimes advantageous.

Preferably a settling zone is provided downstream of the coalescer cartridge to allow the coalesced droplets of the previously dispersed phase to settle. This zone may be situated around or within the cartridge or in a separate vessel. Alternatively, the settling zone may be so arranged that the separated liquids can be separately withdrawn to permit a larger volume for one phase to accommodate slugs of liquid.

According to another aspect of the present invention there is provided a method for coalescing one immiscible liquid finely dispersed in another which method comprises passing a feedstock mixture of the liquids through a cartridge comprising a central inlet or outlet and a circumferential outlet or inlet for radial flow through the cartridge, and a tensioned, resilient, helically coiled plate permeable to liquid and supporting a layer of compressed fibres, one edge of the plate being secured at or near the central inlet or outlet and the other edge being secured at or near the circumferential outlet or inlet.

In use, as stated previously, the cartridge is operated with the fibres compressed. After an extended period of operation the cartridge may become blocked with solids and/or liquid causing an unacceptably high pressure drop and reducing the efficiency of coalescence. The cartridge is then easily regenerated by slightly unwinding the helically coiled support plate to release the compression on the fibres and open up the network to a series of relatively wide channels. The contaminants are then removed by backwashing either with the filtrate or with separately introduced backwash liquid.

The method of the invention is particularly suitable for removing crude petroleum and petroleum products from tanker washings and refinery effluent. Normally these contain from 5 to 750 mg of crude petroleum or petroleum products per kg of water. In general, the amount of suspended solids is very variable; however, typical effluents contain 10 to 500 ppm of suspended solids.

By altering the material of the fibre and the extent of the compression of the cartridge, the degree of filtration and coalescence can be regulated.

In the following discussion of the mechanism of coalescence, a dispersion of traces of oil in water is considered as a typical feedstock for treatment. However, the invention is also applicable to the coalescence of droplets of water dispersed in oil and to other phase mixtures.

The flow rate of the contaminated water should be related to the fibre diameter in the beds, the thickness of the fibre layer, the cross-sectional area of the beds and the extent of compression of the fibres, so that some turbulence is created in the liquid as it flows through the cartridge but not sufficient turbulence to prevent the deposition of a film of oil on the fibres nor to strip a deposited film off. This favors the movement of oil droplets across the stream lines in the winding passages in the network of the cartridge so that they will collide with the oil film on the fibres and with each other.

Droplets colliding with the oil film result in the growth of the oil film and eventually larger droplets or globules drop off. Inter-droplet collisions may also lead to coalescence and droplet growth. If the water velocity is too great, however, the resulting increased turbulence strips the oil film from the fibres and breaks up oil droplets, thereby reversing the above effects.

Optimum flow rates can be chosen for given cartridge dimensions and fibre diameters in the cartridge. In general, the hydraulic loading of liquid flowing through the equipment is in the range 15 to 150 $m^3/m^2/h$.

The embodiment regarded as a filter cartridge may in some cases be used in conjunction with the rigid glass elements of coalescers of the prior art or similar devices. In this case, the filter cartridge is inserted into the central aperture of the coalescer cartridge and acts as a pre-filter, greatly extending the life of the coalescer cartridge.

Figure 2:
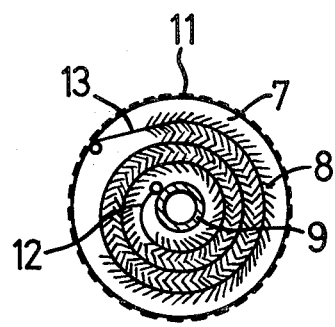

The invention is illustrated with reference to FIGS. 1 and 2 of the accompanying drawings wherein both are sectional elevations, FIG. 2 being a section on A—A' of FIG. 1.

With reference to the Figures, a coalescer comprising a housing 1 having an inlet 2, an outlet 3, a cylindrical sidewall 4, a fixed end 5 and a detachable end 6.

The housing contains a cartridge 7 which is produced by winding a perforated metal sheet 8 supporting a layer of nylon fibres around a perforated tube 9 on a spool 10 and inserting the resulting coil into a perforated metal cylinder 11. The metal sheet 8 has end portions 12 and 13 free from fibres to facilitate securing to the internal tube 9 and external cylinder 11 respectively.

The cartridge 7 is held inside the housing 1 with the outlet from the central tube 9 located and sealed in the outlet 3 from the housing by "O" rings 14. The other end of the central tube 9 is fitted to a solid spindle 15 which passes through an "O" ring seal 16 in the detachable end 6 of the housing. A helical spring 17 is compressed between the spool 10 and the detachable end 6 to position the former and keep the outlet of the spool 10 in the seal at the outlet 3 of the housing.

The spindle 15 has a handle 18 by means of which it may be turned and a locking mechanism, e.g. a castellated nut and pin or a lock-nut to hold it in any desired position.

For a filtration and coalescing operation, the spool 10 is wound clockwise to compress the layer of fibres. For backflushing, the spool 10 is wound anti-clockwise for about half a turn to release the compression on that part of the cartridge fibre which has been acting as a filter.

After backflushing, the spool is turned clockwise and locked in the position for normal coalescing operation.

The cartridge is shown in the horizontal position but it may also be used vertically.

I claim:

1. A cartridge for removing contaminants from a liquid, which cartridge comprises (a) a casing having a central port and a circumferential port, (b) a perforated rigid hollow tube, the interior of which is in communication with the central port, (c) a perforated cylinder, the exterior of which is in communication with said circumferential port, (d) a roll of liquid permeable material disposed within the perforated cylinder such that any flow of liquid between the ports passes radially through the roll characterized in that
   (i) the roll is formed from a resilient sheet having a layer of fibers attached thereto,
   (ii) the sheet is attached at its outer end to the perforated cylinder and at its inner end to the perforated tube
   (iii) means are provided to rotate the perforated tube, which means are operable to vary the tension of the resilient sheet during use, to compress the fibres into a network of fine channels, and to open up the network into a series of relatively wide channels.

2. A cartridge according to claim 6 wherein the resilient sheet is a sheet of perforated metal or metal gauze.

3. A cartridge according to claim 1 wherein the fibres are selected from wool, cotton, rayon, nylon, polyacrylonitrile, polyester, mineral wool and metals, or combinations thereof.

4. A method for treating a mixture of a first immiscible liquid finely dispersed in a second immiscible liquid so as to coalesce the first immiscible liquid comprises passing the mixture radially through a cartridge containing a roll of fibrous coalescing material said cartridge comprising (a) a casing having a central port and a circumferential port, (b) a perforated rotatable rigid hollow tube, the interior of which is in communication with said central port, (c) a perforated cylinder, the exterior of which is in communication with said circumferential port, characterized in that
   (i) the fibrous material comprises a mass of fibers held in compression by a coiled liquid permeable resilient sheet supporting said fibers, said sheet being attached at its outer end to the perforated cylinder and at its inner end to the perforated tube to releasably maintain said sheet under tension and compress the fibers into a network of fine channels and
   (ii) after a quantity of the mixture has been passed through the fibrous coalescing material, the rotatable member is rotated so as to reduce the tension on the sheet and the compression of the fibers to open up the network into a series of relatively wide channels and the fibers are then washed by passing a washing liquid through the roll of fibrous material.

* * * * *

UNITED STATES PATENT AND TRADEMARK OFFICE
CERTIFICATE OF CORRECTION

PATENT NO. : 4,411,791
DATED : October 25, 1983
INVENTOR(S) : DENIS S. WARD

It is certified that error appears in the above-identified patent and that said Letters Patent is hereby corrected as shown below:

CLAIM 2, line 1, delete "6" and in its place insert --1--.

Signed and Sealed this

Seventh Day of February 1984

[SEAL]

Attest:

GERALD J. MOSSINGHOFF

Attesting Officer

Commissioner of Patents and Trademarks